US009303972B2

(12) United States Patent
Oberhauser et al.

(10) Patent No.: US 9,303,972 B2
(45) Date of Patent: Apr. 5, 2016

(54) POSITION-MEASURING DEVICE AND METHOD FOR OPERATING THE SAME

(71) Applicant: DR. JOHANNES HEIDENHAIN GmbH, Traunreut (DE)

(72) Inventors: Johann Oberhauser, Vachendorf (DE); Bernhard Schmied, Tittmoning (DE); Jannik Jens Rosenlehner-Emde, Obing (DE); Werner Schwaiger, Ruhpolding (DE); Thomas Schweizer, Traunwalchen (DE); Hubert Mayer, Trostberg (DE); Marc Oliver Tiemann, Salzburg (AT)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 207 days.

(21) Appl. No.: 14/028,566

(22) Filed: Sep. 17, 2013

(65) Prior Publication Data

US 2014/0077795 A1    Mar. 20, 2014

(30) Foreign Application Priority Data

Sep. 20, 2012 (DE) .......................... 10 2012 216 854

(51) Int. Cl.
*G01B 7/30* (2006.01)
*G01D 5/244* (2006.01)
(Continued)

(52) U.S. Cl.
CPC .............. *G01B 7/30* (2013.01); *G01D 5/2455* (2013.01); *G01D 5/24438* (2013.01); *G01D 5/24476* (2013.01); *G06F 1/00* (2013.01); *G06F 2101/00* (2013.01); *G06F 2201/00* (2013.01)

(58) Field of Classification Search
CPC ... G06F 1/00; G06F 2101/00; G06F 2200/00; G06F 2201/00
See application file for complete search history.

(56) References Cited

U.S. PATENT DOCUMENTS 4,134,106 A * 1/1979 Hungerford .................. 341/116
5,774,074 A * 6/1998 Cooper ............... H03M 1/1014
341/11

(Continued)

FOREIGN PATENT DOCUMENTS

DE    4125865 A1    2/1993
DE    19751853 A1    6/1998

OTHER PUBLICATIONS

ERNST, "Digitale Längen—und Winkelmesstechnik", Verlag Moderne Industrie, Dec. 1989, Germany.

*Primary Examiner* — Huy Q Phan
*Assistant Examiner* — Temilade Rhodes-Vivour
(74) *Attorney, Agent, or Firm* — Leydig, Voit & Mayer, Ltd.

(57) ABSTRACT

A position-measuring device includes a code carrier having a first graduation track and a second graduation track, the second graduation track being an incremental graduation track. A first detector system is configured to scan the graduation tracks so as to generate first position signals. A second detector system is configured to scan the second graduation track so as to generate second position signals. A first position-processing unit is configured to process the first position signals so as to yield a first absolute position value. A second position-processing unit is configured to process the second position signals so as to yield a second absolute position value. The first position-processing unit is configured to feed an absolute auxiliary position value to the second position-processing unit. The second position-processing unit is initializable with the absolute auxiliary position value.

17 Claims, 6 Drawing Sheets

(51) Int. Cl.
*G01D 5/245* (2006.01)
*G06F 1/00* (2006.01)

(56) References Cited

U.S. PATENT DOCUMENTS

| | | | |
|---|---|---|---|
| 6,111,402 A | 8/2000 | Fischer | |
| 2003/0169945 A1* | 9/2003 | Stanek | G01S 13/42 382/293 |
| 2004/0007664 A1* | 1/2004 | Mitchell | G01D 5/38 250/237 G |
| 2005/0220456 A1* | 10/2005 | Chou et al. | 398/159 |
| 2011/0049341 A1* | 3/2011 | Nakajima | G01D 5/347 250/231.1 |
| 2011/0122422 A1* | 5/2011 | Yamamoto | G01D 5/24476 356/614 |
| 2011/0147572 A1* | 6/2011 | Nakamura | G01D 5/2448 250/231.16 |
| 2011/0298411 A1* | 12/2011 | Yoshida | G01D 5/3473 318/640 |
| 2012/0041691 A1* | 2/2012 | Fericean | G01D 5/202 702/41 |

* cited by examiner

POSITION-MEASURING DEVICE AND METHOD FOR OPERATING THE SAME

CROSS-REFERENCE TO PRIOR APPLICATION

Priority is claimed to German Patent Application No. DE 10 2012 216 854.0, filed on Sep. 20, 2012, the entire disclosure of which is hereby incorporated by reference herein.

FIELD

The present invention relates to a position-measuring device for determining absolute position values, which provides two position values that are generated substantially independently of one another, and to a corresponding method for operating such a position-measuring device.

BACKGROUND

Position-measuring devices include mainly rotary encoders or angle-measuring devices, as well as length-measuring devices. Rotary encoders are frequently used as measuring devices for electrical drives, in particular to determine the absolute angular position of motor and drive shafts. Length-measuring devices are employed for measuring linear movements of, for example, a tool carriage in a machine tool. For details regarding the design of such position measuring systems, reference may be made, for example, to the textbook by Alfons Ernst entitled "Digitale Laengen-und Winkelmesstechik" [Digital Longitudinal and Angle Measuring Technology], Moderne Industrie, publishers, (1989).

For purposes of generating an absolute position value, a code carrier has graduation tracks provided thereon which are scanned in a measuring direction by a detector system so as to generate position signals. The position signals, in turn, are processed to yield an absolute position value.

With respect to the graduation tracks, a fundamental distinction is made between incremental and absolute graduation tracks. Incremental graduation tracks are formed by a plurality of graduation elements which are arranged one behind the other at equal intervals and which may be scanned to thereby determine changes in relative position. In contrast, in the case of absolute graduation tracks, the graduation elements are arranged in such a way that an absolute position value can be determined at any desired time. There are known absolute graduation tracks which include several code tracks arranged parallel to each other, so that the absolute position is parallel-coded. Also known are absolute graduation tracks where the absolute position is serial-coded in the form of a chain code. While incremental graduation tracks can in principle achieve higher resolutions, absolute graduation tracks have the advantage of allowing an absolute position value to be determined at any desired time, even immediately after the position-measuring device is turned on.

In order to obtain a high-resolution, absolute position-measuring device, firstly, an incremental graduation track may be provided parallel to an absolute graduation track. Thus, the absolute reference to the absolute graduation track is established, and the high resolution is achieved in conjunction with the incremental graduation track. The absolute graduation track may be parallel-coded or serial-coded, but it may be embodied in such a way that an analog scanning signal is generated during the scanning operation and that the absolute position can be deduced from said analog scanning signal. German Patent Application DE 197 51 853 A1, for example, describes a design for an inductive rotary encoder where the scanning of an inner graduation track yields exactly one period of a sinusoidal wave per revolution. The phase angle of the inner graduation track, in conjunction with an incremental outer graduation track, yields a high-resolution absolute position value.

Another way of implementing an absolute position-measuring device is by means of two or more incremental graduation tracks which are provided parallel to each other and have different graduation periods and which are dimensioned such that the absolute position can be uniquely determined from the phase angles of the scanning signals within the measurement range (one shaft revolution in the case of a rotary encoder). Fundamentals of this technique may be taken, for example, from DE 41 25 865 A1.

It is important, especially with regard to safety aspects, that position and angle values which are determined by the position-measuring device and transmitted to subsequent electronics (e.g., a numerical control system) be reliable; i.e., that even in the event of a technical failure, a usable position or angle value should still be generated in the position-measuring device, or at least that such a failure is either already detected in the position-measuring device and communicated to the numerical control system, or detectable in the numerical control system based on the position or angle values received from the position-measuring device.

In this connection, it is known that two identical position-measuring units having suitable detectors and signal-processing circuits may be provided to generate two independent measured values in the position-measuring device. However, such approaches are very expensive and should therefore be avoided.

SUMMARY

In an embodiment, the present invention provides a reliable position-measuring device that is simple in design. In another embodiment, the present invention provides a method for operating such a reliable position-measuring device.

In accordance with an embodiment of the present invention, the position-measuring device includes:
- a code carrier having at least a first graduation track and a second graduation track, the second graduation track being an incremental graduation track,
- a first detector system for generating first position signals by scanning the first graduation track and the second graduation track in a measuring direction,
- a second detector system for generating second position signals by scanning the second graduation track in a measuring direction,
- a first position-processing unit for processing the first position signals to yield a first absolute position value, and
- a second position-processing unit for processing the second position signals to yield a second absolute position value, the second position-processing unit being initializable with an absolute auxiliary position value which is fed to the second position-processing unit from the first position-processing unit.

A method for operating a position-measuring device is proposed, said position-measuring device, in an embodiment, including:
- a code carrier having at least a first graduation track and a second graduation track, the second graduation track being an incremental graduation track,
- a first detector system for generating first position signals by scanning the first graduation track and the second graduation track in a measuring direction, a second detector system for generating second position signals by scanning the second graduation track in a measuring direction, a first position-processing unit for processing the first position signals to yield a first absolute position value, and a second position-processing unit for processing the second position signals to yield a second absolute position value, in which method the second position-processing unit is initialized during an initialization phase with an absolute auxiliary position value which is fed to the second position-processing unit from the first position-processing unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
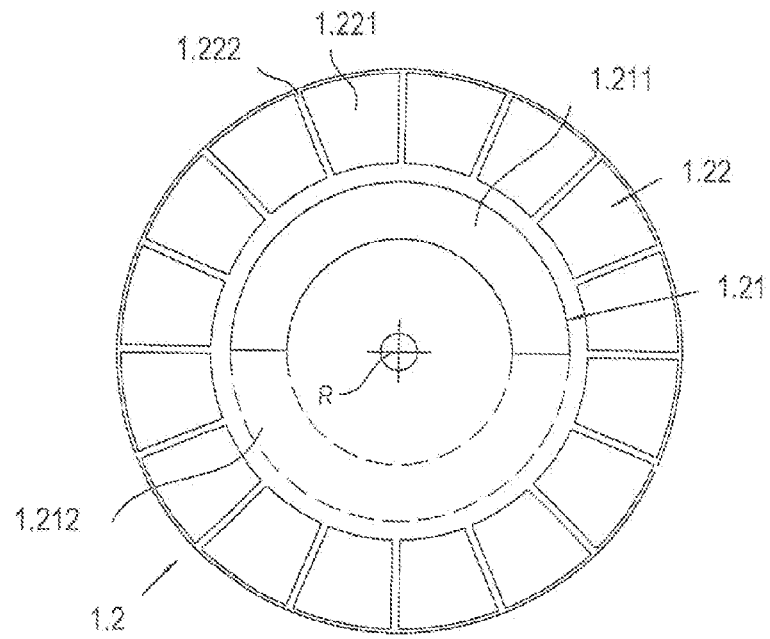
FIG. 1 is a top view of a code disk of an inductive rotary encoder.
Figure 2:
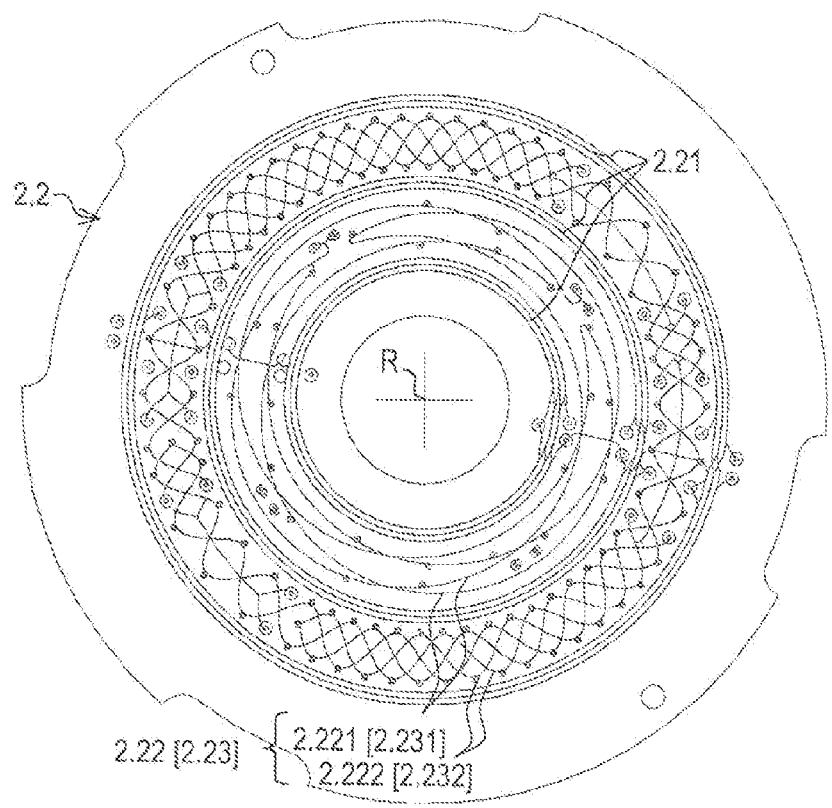
FIG. 2 is a top view of a scanning circuit board of an inductive rotary encoder.
Figure 4:
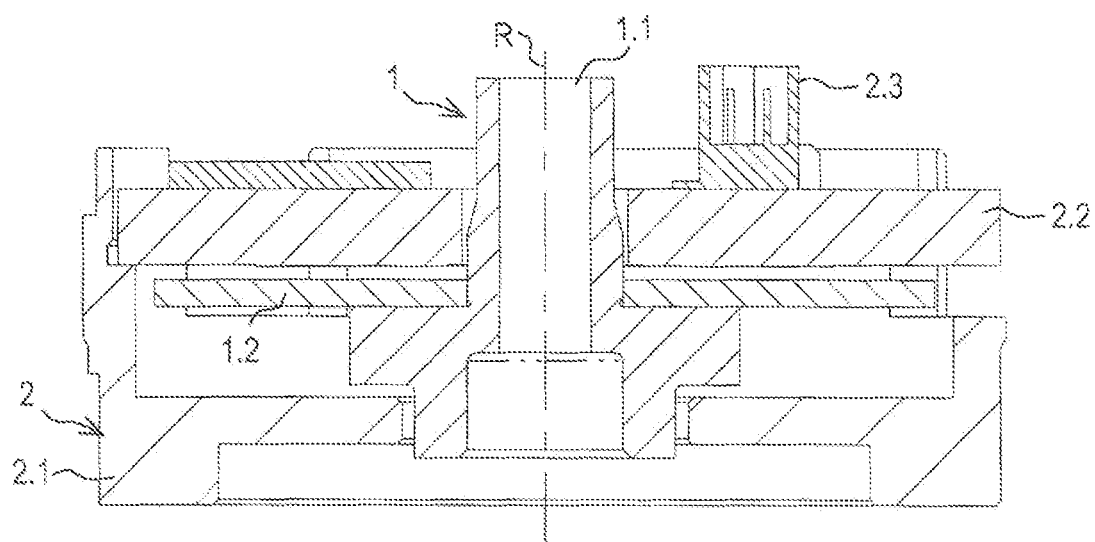
FIG. 4 is a cross-sectional view of a rotary encoder.

FIGS. 1, 2 and 4 illustrate the basic design of a position-measuring device according to an embodiment of the present invention, which takes the form of a rotary encoder operating according to the inductive measuring principle. A detailed description of such a rotary encoder is given, for example, in DE 197 51 853 A1, which is hereby incorporated by reference for its disclosure of the rotary encoder details. It is, however, expressly noted that the present invention is not limited to this measuring principle.

In accordance with FIG. 4, the rotary encoder includes a rotor 1 and a stator 2. In the exemplary embodiment illustrated, rotor 1 includes a shaft 1.1 which may, for example, be non-rotatably mounted to a motor shaft to be measured. For purposes of recording the angular position of shaft 1.1, a code carrier 1.2 in the form of a code disk 1.2 having graduation tracks 1.21, 1.22 (see FIG. 1) is non-rotatably secured to a shoulder of shaft 1.1.

Stator 2 includes a housing 2.1, to which an annular scanning circuit board 2.2 is attached as a carrier body. Among other things, a connector 2.3 is mounted on scanning circuit board 2.2, allowing signals and electrical power to be transmitted therethrough. Rotor 1 and stator 2, and, respectively, shaft 1.1 and housing 2.1, are rotatable relative to each other about an axis of rotation R.

FIG. 1 is a top view of code disk 1.2. Code disk 1.2 includes a substrate, which in the exemplary embodiment illustrated is formed of epoxy resin and has two graduation tracks 1.21, 1.22 provided thereon. Graduation tracks 1.21, 1.22 have annular shapes with different diameters and are arranged on the substrate concentrically with respect to axis of rotation R. Each of the two graduation tracks 1.21, 1.22 includes a periodic sequence of alternating electrically conductive graduation regions 1.211, 1.221 and non-conductive graduation regions 1.212, 1.222. As a material for electrically conductive graduation regions 1.211, 1.221, copper was applied to the substrate in the example shown. In non-conductive graduation regions 1.212, 1.222, by contrast, substrate is not coated.

In the embodiment illustrated, inner graduation track 1.21 includes a first semi-annular graduation region 1.211 containing electrically conductive material (here copper) as well as a second semi-annular graduation region 1.212 in which no conductive material is provided.

Second graduation track 1.22 is disposed radially adjacent to first graduation track 1.21 on the substrate and includes a plurality of electrically conductive graduation regions 1.221 and non-conductive graduation regions 1.222 disposed therebetween. In terms of material, the different graduation regions 1.221, 1.222 are configured similar to graduation regions 1.211, 1.212 of first graduation track 1.21. In the exemplary embodiment shown, second graduation track 1.22 includes a total of sixteen periodically arranged, electrically conductive graduation regions 1.221 and correspondingly sixteen non-conductive graduation regions 1.222 disposed therebetween.

Figure 5:
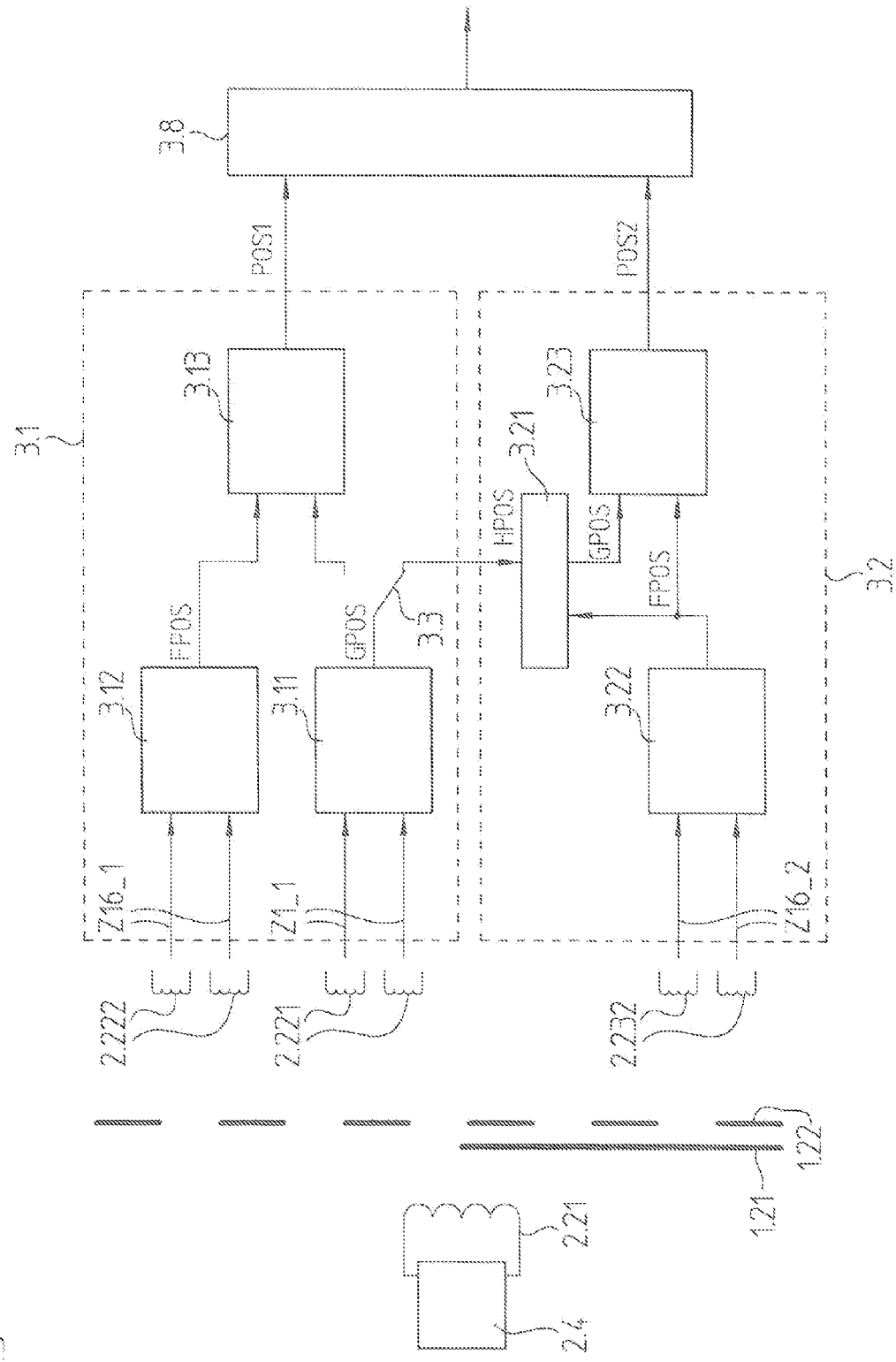
FIG. 5 is a schematic circuit diagram of a first embodiment of a position-measuring device according to the present invention.
Figure 6:
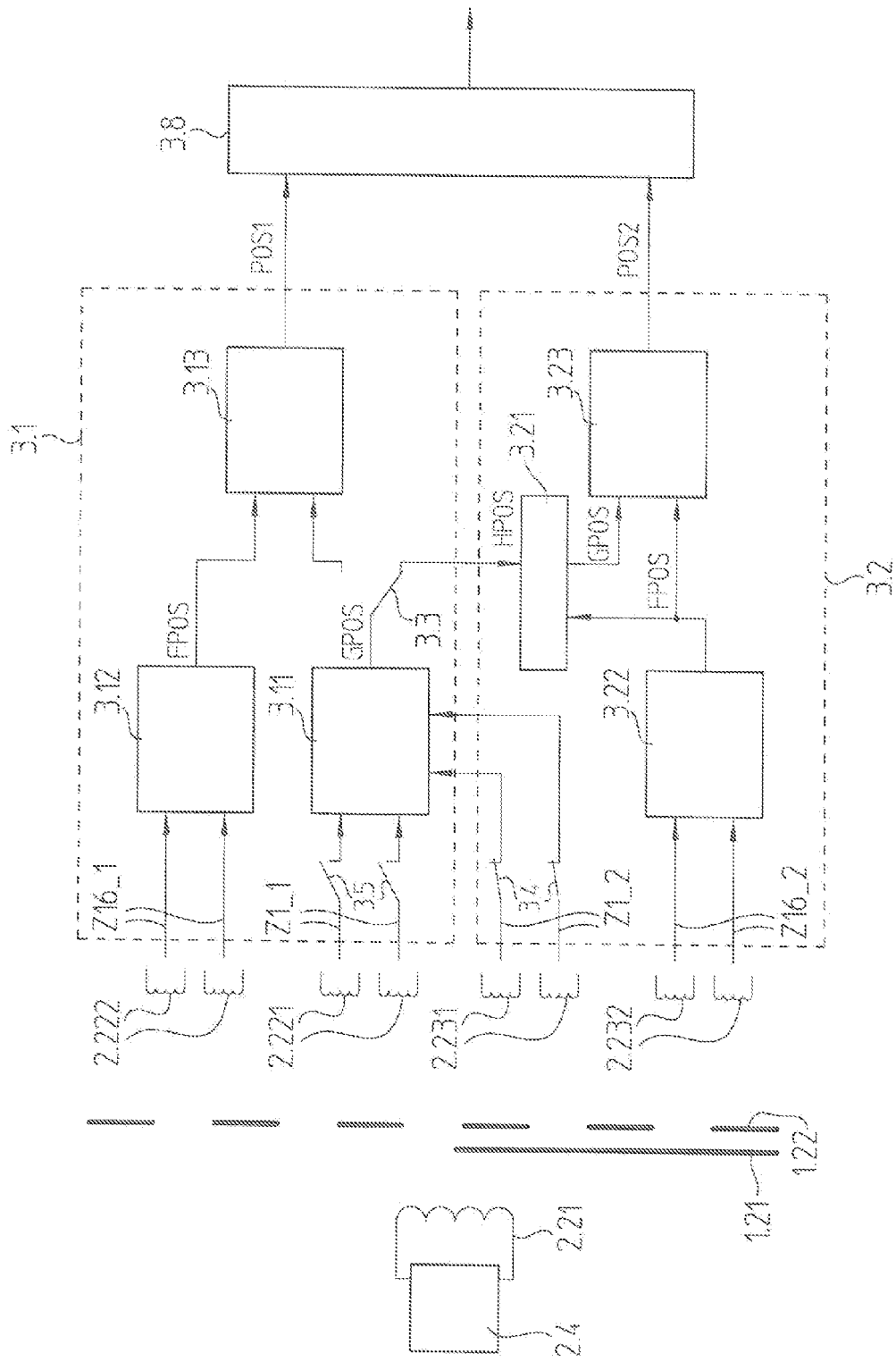
FIG. 6 is a schematic circuit diagram of a second embodiment of a position-measuring device according to the present invention.

As will be shown with reference to FIGS. 5 and 6, absolute positions of rotor 1 relative to stator 2 and of shaft 1.1 relative to scanning circuit board 2.2, respectively, can be determined by scanning first graduation track 1.21. For this reason, first graduation track 1.21 is an absolute graduation track 1.21. In contrast, scanning of second graduation track 1.22 yields a position signal which has a plurality of periods during one revolution of rotor 1 and shaft 1.1, respectively. Therefore, second graduation track 1.22 is an incremental graduation track 1.22. Scanning circuit board 2.2, shown in FIG. 2 and provided for scanning code disk 1.2, is used as a carrier body, among other things, for a first detector system 2.22 including different receiver coils 2.22. These receiver coils 2.22 have receiver conductor paths 2.221 in an inner receiver track and additional receiver conductor paths 2.222 in an outer receiver track. Associated pairs of receiver conductor paths 2.221, 2.222 of a particular receiver track are offset relative to each other such that they are able to provide signals that are 90 degrees out of phase.

In addition to first detector system 2.22, scanning circuit board 2.2 further includes a second detector system 2.23. This second detector system likewise includes receiver conductor paths 2.231 in an inner receiver track and additional receiver conductor paths 2.232 in an outer receiver track. In the second detector system 2.23, too, associated pairs of receiver conductor paths 2.231, 2.232 of a particular receiver track are offset relative to each other such that they likewise provide signals that are 90 degrees out of phase.

In order to allow receiver conductor paths 2.221, 2.222 of first detector system 2.22 and receiver conductor paths 2.231, 2.232 of second detector system 2.23 to be disposed on top of each other, scanning circuit board 2.2 is formed of multiple layers in accordance with the known technology. In order to simplify the diagram, second detector system 2.23 and the associated receiver conductor paths 2.231, 2.232 are not explicitly shown, but indicated by their reference numerals in brackets adjacent to the corresponding reference numerals of first detector system 2.22 and receiver conductor paths 2.221, 2.222.

As will be shown further below, receiver conductor paths 2.231 are optional and are present only in the exemplary embodiments of a rotary encoder according to the present invention that are described with reference to FIGS. 6 and 7.

In addition to the conductor paths of detector systems 2.22, 2.23, scanning circuit board 2.2 is further provided with excitation conductor paths 2.21, which are applied on an inner, a middle and an outer excitation track and serve as excitation windings. Scanning circuit board 2.2 itself has a center hole and is designed as a multilayer circuit board, as mentioned earlier.

In the assembled state, code disk 1.2 and scanning circuit board 2.2 oppose one another such that axis R extends through the center points of both elements and that, in response to relative rotation between code disk 1.2 and scanning circuit board 2.2, position signals can be generated as a function of the instantaneous angular position by induction effects in receiver conductor paths 2.221, 2.222 of first detector system 2.22 and in receiver conductor paths 2.231, 2.232 of second detector system 2.23 of scanning circuit board 2.2.

Thus, receiver conductor paths 2.221, 2.222, 2.231, 2.232 constitute position detectors 2.221, 2.222, 2.231, 2.232. As mentioned earlier herein, the present invention is independent of the physical scanning principle. For example, if an optical scanning principle is used instead of an inductive one, position detectors 2.221, 2.222, 2.231, 2.232 may take the form of photo-sensors, whereas magnetic sensors (such as Hall-effect elements or MR sensors) would be used for the magnetic scanning principle. In general terms, receiver conductor paths 2.221 are first position detectors 2.221 and receiver conductor paths 2.222 are second position detectors 2.222 of first detector system 2.22. Analogously, receiver conductor paths 2.231 are first position detectors 2.231 and receiver conductor paths 2.232 are second position detectors 2.232 of second detector system 2.23.

It is a prerequisite for the generation of corresponding signals that excitation conductor paths 2.21 generate a time-changing electromagnetic excitation field in the area of the scanning tracks and in the area of graduation tracks 1.21 and 1.22 scanned by them. In the exemplary embodiment shown, excitation conductor paths 2.21 take the form of multiple planar-parallel, current-carrying, individual conductor paths. If the excitation conductor paths 2.21 of a conductor path unit all carry an excitation current in the same direction, then a tubular or cylindrical electromagnetic field is formed around the respective conductor path unit. The field lines of the resulting electromagnetic field extend in the form of concentric circles around the conductor path units, the direction of the field lines depending on the direction of the current in the conductor path units as is generally known. The directions of the currents in the conductor path units directly adjacent to a shared scanning track, and the corresponding interconnections of these conductor path units, must be selected to be opposite such that the field lines in the area of the scanning tracks in each case have the same orientation.

Figure 3A:
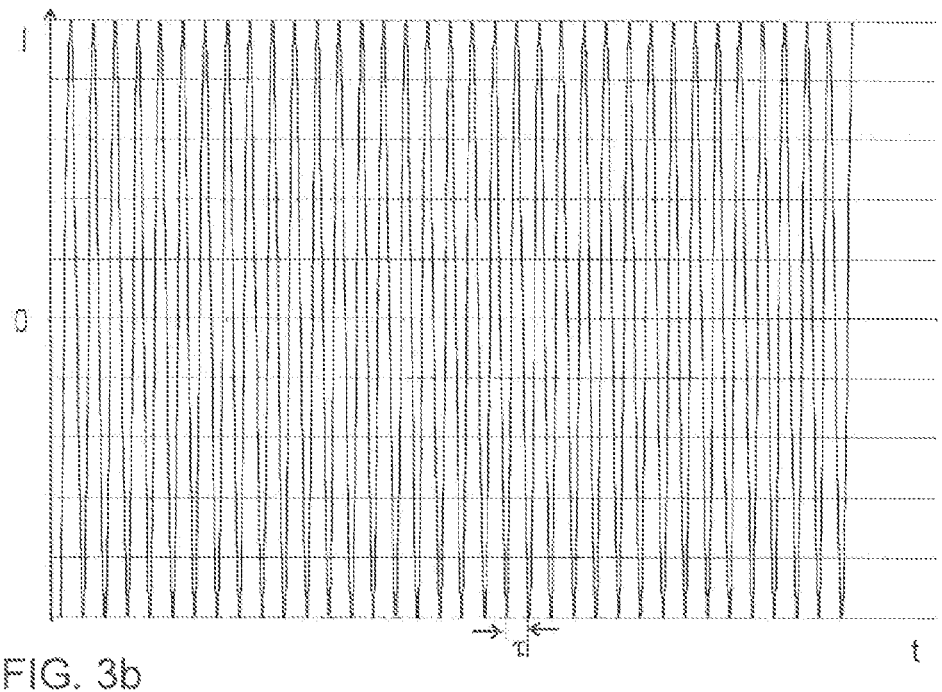
FIG. 3a illustrates a signal waveform of the excitation current in the excitation windings.
Figure 3B:
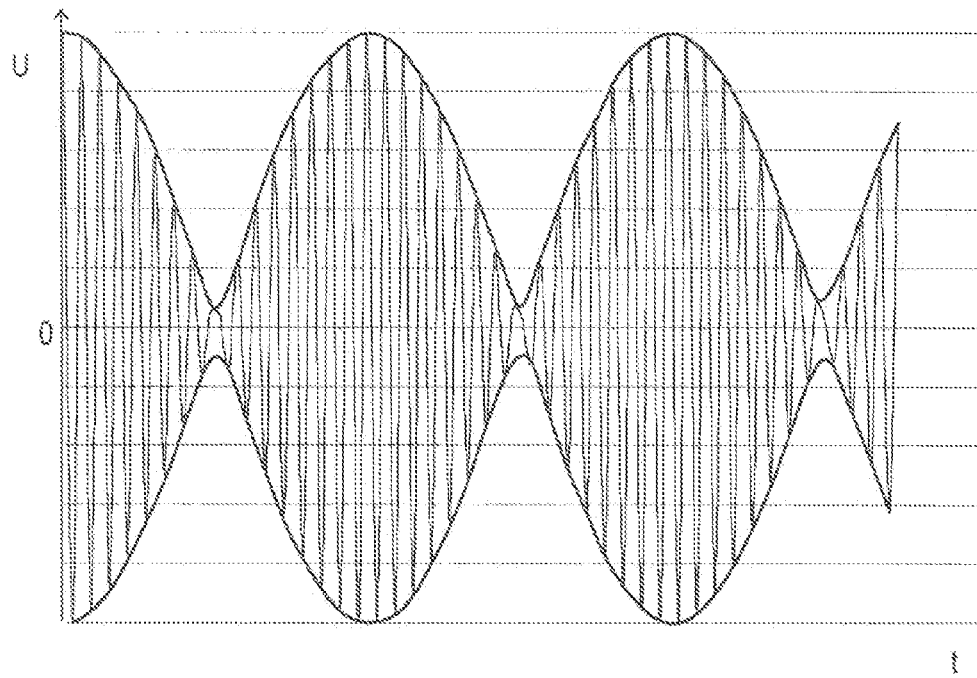
FIG. 3b illustrates a signal waveform of the induced voltage in detector windings.

During operation of the rotary encoder, excitation conductor paths 2.21 are traversed by an alternating current which, in turn, generates an alternating electromagnetic field. This alternating electromagnetic field induces an alternating voltage in receiver conductor paths 2.221, 2.222, 2.231, 2.232, the amplitude of which is dependent on the relative position of code disk 1.2 with respect to circuit board 2.2; i.e., with respect to detector systems 2.22, 2.23. In this regard, FIG. 3a shows a signal waveform of excitation current I in excitation conductor paths 2.21, which has a period τ, while FIG. 3b illustrates an exemplary voltage waveform of the voltage U induced in receiver conductor paths 2.221, 2.222, 2.231, 2.232 at a constant rotational speed of shaft 1.1 and of the code disk 1.2 non-rotatably connected thereto. As can clearly be seen, induced voltage U is an amplitude-modulated signal where the amplitude of the envelope is dependent on the position of graduation tracks 1.21, 1.22 in relation to receiver conductor paths 2.221, 2.222, 2.231, 2.232. The number of signal periods of this envelope per revolution of code disk 1.2 is dependent on the number of graduation periods of the graduation track 1.21, 1.22 being scanned.

FIG. 5 is a block diagram of a first exemplary embodiment, with reference to which the operation of a position-measuring device according to the present invention will be explained using the example of an inductive rotary encoder. As described earlier, the measuring principle of an inductive rotary encoder, for example, is based on the generation of an alternating electromagnetic field in excitation conductor paths 2.21. In the present exemplary embodiment, this is accomplished by means of an oscillator unit 2.4 which, together with excitation conductor paths 2.21, form an oscillator circuit. First graduation track 1.21 and second graduation track 1.22 of code disk 1.2 are merely schematically indicated in FIG. 5.

In this exemplary embodiment, it is assumed that first graduation track 1.21 and the receiver conductor paths 2.221, 2.231 provided for scanning the same are configured in such a way that the position signals resulting from scanning have one period per revolution of shaft 1.1 of the rotary encoder.

A first position-processing unit 3.1 is provided for generating a first absolute position value POS1 from first position signals Z1_1, Z16_1, which result from the scanning of graduation tracks 1.21, 1.22 with receiver conductor paths 2.221, 2.222 of first detector unit 2.22. First position-processing unit 3.1 includes a coarse position analyzer 3.11, a fine position analyzer 3.12, and a position value generator 3.13.

Coarse position analyzer 3.11 receives position signals Z1_1 (the induced voltages with position-dependent amplitude) of first position detector 2.221, which result from the scanning of first graduation track 1.21. These are two amplitude-modulated signals that are 90 degrees out of phase and whose envelopes, which contain the position-dependent components of position signals Z1_1, have exactly one period per revolution of shaft 1.1. Thus, the absolute position of the shaft can be deduced from position signals Z1_1. In this exemplary embodiment, first graduation track 1.21 is therefore an absolute graduation track 1.21. Coarse position analyzer 3.11 processes position signals Z1_1 to yield an absolute coarse position value GPOS. As suggested by the name, coarse position value GPOS may have a relatively low resolution of, for example, 32 ($2^5$) steps. In practice, coarse position analyzer 3.11 is a very extensive electronic circuit which, in order to provide for the generation of coarse position value GPOS, includes, for example, functional blocks which perform the processing steps, such as demodulation, A/D conversion, signal correction, and interpolation.

As an alternative to this example, where coarse position value GPOS is determined by analyzing analog position signals Z1_1, first graduation track 1.21, as an absolute graduation track 1.21, may also be parallel-coded (e.g., Gray code) or serial-coded (Pseudo Random Code, PRC) in digital form.

Fine position analyzer 3.12 receives position signals Z16_1 of second position detector 2.222 of first detector system 2.22, which result from the scanning of second graduation track 1.22. These are also two amplitude-modulated signals that are 90 degrees out of phase. Here, however, the envelopes of these signals, which contain the position-dependent components of position signals Z16_1, have a plurality of periods (16 in the example above) per revolution of shaft 1.1. Since the individual periods cannot be distinguished from each other, only a relative position can be determined from these position signals. Fine position analyzer 3.12 processes position signals Z16_1 to yield a fine position value FPOS. This is accomplished by demodulating position signals Z16_1 and subsequently dividing the resulting signals into positional steps or angular steps (interpolation).

For the sake of completeness, it should be noted that there is no need to demodulate position signals Z16_1 when other scanning principles, such as optical or magnetic ones, are used, because in this case, the amplitude of the position signals is directly position-dependent.

In comparison with coarse position value GPOS, fine position value FPOS may have a higher resolution of, for example, 16384 ($2^{14}$) positional steps or angular steps per period. In other words, the value range of fine position value FPOS covers only an angular segment whose angular range corresponds to that of a period of the position signal of second position detector 2.222; i.e., the values of fine position value FPOS repeat in each graduation period of second graduation track 1.22.

Coarse position value GPOS and fine position value FPOS are now fed to position value generator 3.13, which generates from the two values the first absolute position value POS1 with high accuracy. This is accomplished by supplementing the low-resolution coarse position value GPOS with the high-resolution fine position value FPOS, whereby fine position value FPOS is given an absolute reference. This technique is known to those skilled in the art by the designation "code connection". To be able to ensure a reliable code connection, the value ranges of coarse position value GPOS and fine position value FPOS must overlap by at least 1 bit. In the example shown, coarse position value GPOS must have a value range of 4 bits to be able to distinguish the 16 graduation periods of second graduation track 1.22. Thus, 5 bits are required for a reliable code connection. In practice, it is preferred to choose a larger region of overlap, which results in a favorable value range of 8 bits or more for the coarse position value.

A second position-processing unit 3.2 is provided for generating a second, redundant position value POS2. Second position-processing unit 3.2 includes a coarse position determination unit 3.21 in the form of a counter 3.21, a fine position analyzer 3.22, and a position value generator 3.23.

In the same manner as in first position-processing unit 3.1, the fine position analyzer 3.22 of second position-processing unit 3.2 processes position signals Z16_2 of second position detector 2.232 of second detector system 2.23 to yield a fine position value FPOS. Like position signals Z16_1 of second position detector 2.222 of first detector system 2.22, position signals Z16_2 of second position detector 2.232 of second detector system 2.23 result from the scanning of first graduation track 1.22. Fine position value FPOS is fed to counter 3.21, which is adapted to count changes of fine position value FPOS in a manner dependent on the direction of rotation. Thus, the counter value of the counter 3.21 represents a coarse position value GPOS, which can be used to extend the value range of fine position value FPOS to one revolution of shaft 1.1. For this purpose, coarse position value GPOS and fine position value FPOS are fed to position value generator 3.23. In order to ensure a reliable code connection in position value generator 3.23, it is also advantageous here if the value ranges of fine position value FPOS and coarse position value GPOS overlap. Therefore, counter 3.21 is advantageously designed to count, for example, four steps per period of the demodulated fine position signals Z16_2. To this end, the signal waveform of the demodulated fine position signals Z16_2 is divided into four regions (quadrants), and the transition from one region to the next is counted as a change event of fine position value FPOS in a manner dependent on the direction of rotation. In this case, one speaks also of a quadrant counter.

Since both fine position value FPOS and coarse position value GPOS result from the scanning of second graduation track 1.22, which is an incremental graduation track 1.22, initially none of these values has an absolute reference. Therefore, the present invention provides for counter 3.21 to be initialized with an absolute auxiliary position value HPOS generated by first position-processing unit 3.1. In this exemplary embodiment, the absolute auxiliary position value HPOS is the coarse position value GPOS of first position-processing unit 3.1, which is now not only fed to position value generator 3.13, but also to counter 3.21. For this purpose, switching devices may be provided, for example, in the form of a switch element 3.3, via which coarse position value GPOS can be fed to counter 3.21. Advantageously, the initialization is performed during an initialization phase immediately after the rotary encoder is turned on.

Position value generator 3.23 of second position-processing unit 3.2 can then generate the second absolute position value POS2 from fine position value FPOS and the coarse position value GPOS that is present as an absolute value after the initialization.

Thus, due to the design of second position-processing unit 3.2 in accordance with the present invention, a coarse position analyzer 3.11, which is present in first position-processing unit 3.1 and which is a very complex electronic circuit, may be dispensed with and replaced by counter 3.21, which is easy to implement. Nevertheless, two absolute position values POS1, POS2 which are generated substantially independently of one another are available in the position-measuring device. By comparing the two position values POS1, POS2, a defect in the position-measuring device can be detected with very high probability.

Position values POS1, POS2 are fed to a communication unit 3.8, from which they can be transmitted to subsequent electronics (e.g., a numerical control system). The comparison of the two position values POS1, POS2 may be performed either already in communication unit 3.8 or later in the subsequent electronics.

FIG. 6 is a block diagram showing an improved implementation of the position-measuring device shown in FIG. 5. Functional blocks which have already been described in connection with the exemplary embodiment of FIG. 5 are similarly numbered in FIG. 6.

Unlike the exemplary embodiment described with reference to FIG. 5, second detector system 2.23 of FIG. 6 additionally includes receiver conductor paths 2.231 constituting a first position detector 2.231, which scans first graduation track 1.21 of code disk 1.2. Position signals Z1_2 of first position detector 2.231 of second detector system 2.23 can be fed to first coarse position analyzer 3.11 of first position-processing unit 3.1 in place of position signals Z1_1 of first position detector 2.221 of first detector system 2.22. To this end, additional switching devices may be provided, such as a switch element 3.4 via which first position detector 2.231 of second detector system 2.23 can be connected to coarse position analyzer 3.11 during the initialization phase, as well as a switch element 3.5 via which first position detector 2.221 of first detector system 2.22 can be disconnected from coarse position analyzer 3.11 during the initialization phase.

The particular advantage of this embodiment is that the detectors used in first position-processing unit 3.1 to generate the coarse position value GPOS that is fed as an absolute auxiliary position value HPOS to second position-processing unit 3.2 in order to initialize counter 3.21, and thus to establish an absolute reference for second position value POS2, are different from those used to generate coarse position value GPOS in first position-processing unit 3.1 during normal operation outside the initialization phase. Thus, for example, defects of position detectors 2.221, 2.231 may be discovered immediately after the rotary encoder is turned on.

This embodiment is especially suited for position-measuring devices which operate according to the inductive measuring principle, because here, second position detector 2.231 is implemented only by conductor paths. Since scanning circuit board 2.2, on which the receiver conductor paths 2.221, 2.222, 2.231, 2.232 are arranged, already has a sufficient number of layers, second position detector 2.231 of second detector system 2.23 can be added virtually without additional expense or material.

Figure 7:
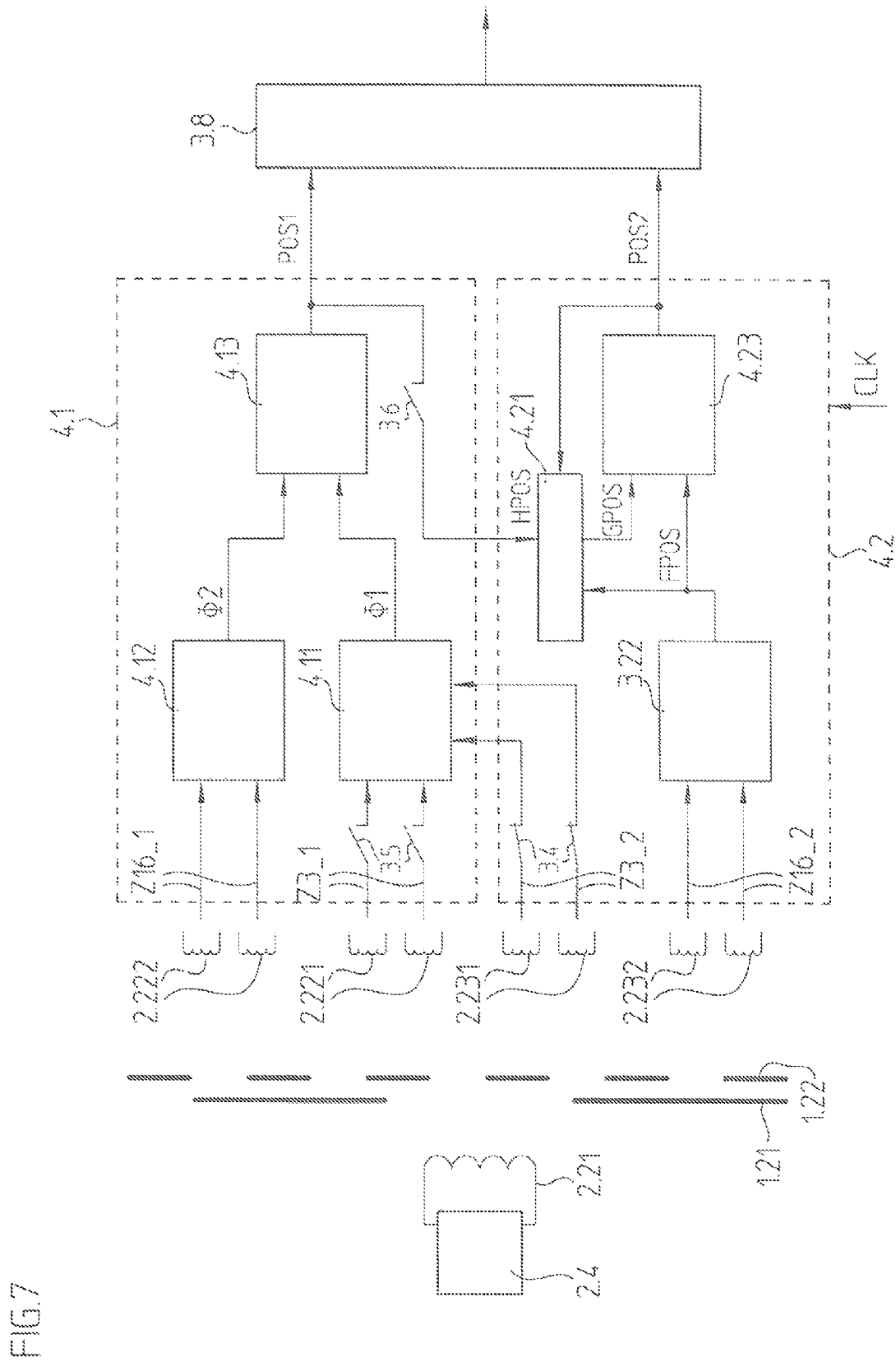
FIG. 7 is a schematic circuit diagram of a third embodiment of a position-measuring device according to the present invention.

FIG. 7 is a block diagram of a further embodiment of a position-measuring device according to the present invention. Similar to the variants described with reference to FIGS. 5 and 6, this embodiment is also based on the inductive scanning principle. Functional blocks which have already been described in connection with the exemplary embodiments discussed above are similarly numbered in FIG. 7. Like the preceding embodiments, this variant is not limited to the inductive scanning principle, but can be applied by those skilled in the art to any scanning principle, in particular optical, magnetic or capacitive scanning principles.

As mentioned preliminarily hereinabove, an absolute position value may also be obtained by providing a plurality of incremental graduation tracks having different graduation periods. To this end, the number of graduation periods must be selected such that the phase angles of the scanning signals resulting from the scanning of the incremental graduation tracks will always yield unique, non-repeating value combinations for all positions to be distinguished within the measurement range (one revolution of shaft 1.1 in the case of rotary encoders, of the length of the scale in the case of length-measuring devices). Suitable values for the selection of the graduation periods can be taken from the relevant literature by those skilled in the art. Fundamentals in this regard can be found, for example, in DE 41 25 865 A1.

In the present example, first graduation track 1.21 and the first position detectors 2.221, 2.231 that form part of the corresponding detector systems 2.22, 2.23 and are provided for scanning first graduation track 1.21 are designed such that position signals Z3_1, Z3_2 yield three periods per revolution of shaft 1.1. As for the second graduation track 1.21 and the associated second detector systems 2.222, 2.232, the 16 periods per revolution used in the preceding exemplary embodiments have been retained. Since none of the two graduation tracks 1.21, 1.22 has an absolute reference and the scanning thereof produces position signals having a plurality of signal periods per revolution of shaft 1.1, graduation tracks 1.21, 1.22 can be regarded as incremental graduation tracks 1.21, 1.22.

Thus, in this exemplary embodiment, first position-processing unit 4.1 receives first position signals Z3_1 from first position detector 2.221 of first detector unit 2.22 and second position signals Z16_1 from second position detector 2.222 of first detector unit 2.22 and processes said signals to yield first absolute position value POS1. For this purpose, first position-processing unit 4.1 includes a first analyzer 4.11, a second analyzer 4.12, as well as a position value generator 4.13.

Analyzers 4.11, 4.12 are adapted to determine phase angles $\Phi 1$, $\Phi 2$ from the position signals Z3_1, Z3_16 they receive. Graduation tracks 1.21, 1.22 are dimensioned such that for each revolution of shaft 1.1, a value range of 3*360° is obtained for first phase angle $\Phi 1$, and a value range of 16*360° is obtained for second phase angle $\Phi 2$. Within one revolution of shaft 1.1, phase angles $\Phi 1$, $\Phi 2$ always yield unique pairs of values, so that each value pair can be correlated to an absolute position value. This correlation is accomplished, for example, through calculation or by means of a table in position value generator 4.13, which receives the two phase angles $\Phi 1$, $\Phi 2$.

Second position-processing unit 4.2 corresponds to that described in the preceding exemplary embodiments in that it also uses only the position signals Z16_2 resulting from the scanning of second graduation track 1.22 in order to generate second position value POS2, and in that the absolute reference is established by initializing coarse position determination unit 4.21 with auxiliary position value HPOS. However, in this case, unlike the preceding exemplary embodiments, coarse position determination unit 4.21 is not a counter, but a memory unit 4.21, which receives absolute auxiliary position value HPOS and second absolute position value POS2. Both auxiliary position value HPOS and second absolute position value POS2 can be stored in memory unit 4.21, and the currently stored value can be output to position value generator 4.23 as a coarse position value GPOS.

In this exemplary embodiment, the absolute auxiliary position value HPOS fed to second position-processing unit 4.2 is the first absolute position value POS1, which is generated in first position-processing unit 4.1. To this end, switching devices may be provided in the form of a switch element 3.6.

In order to establish an absolute reference, during the initialization phase, first absolute position value POS1 is stored in memory unit 4.21 of second position-processing unit 4.2 and output to position value generator 4.23 as a coarse position value GPOS. Position value generator 4.23 generates second absolute position value POS2 from coarse position value GPOS and the fine position value FPOS generated by fine position analyzer 3.22. Once the second absolute position value POS2 is available, it is stored into memory unit 4.21 at intervals defined by a clock signal CLK, and, in turn, output to position value generator 4.23 as a coarse position value GPOS. The frequency of clock signal CLK is selected such that the transition from one graduation period of the incremental graduation track to the next can be reliably detected, even when the rate of change of fine position value FPOS is maximum.

In this exemplary embodiment, the value ranges of coarse position value GPOS and fine position value FPOS must also overlap by at least 1 bit to be able to generate second absolute position value POS2. In the example shown, this means that coarse position value GPOS must have a bit width of 5 bits or more, because 4 bits are already needed to be able to identify the current signal period of the incremental graduation track. In practice, however, it is preferred to use a larger overlap region, up to the full value range of second absolute position value POS2. The selected overlap region also determines the required bit width of memory unit 4.21, as well as the number of higher-order bits that are fed to memory unit 4.21 from first absolute position value POS1 and from second absolute position value POS2.

To optimize the resolution of the position-measuring device, it is advantageous to generate fine position value FPOS in second position-processing unit 4.2 using those position signals which result from the scanning of the incremental graduation track that has the largest number of graduation periods. In the example shown, these are the position signals Z2_16 resulting from the scanning of second graduation track 1.22.

In this exemplary embodiment, first position detector 2.231 of second detector unit 2.23 can also be considered an optional one which may be used to make the generation of second absolute position value POS2 even more reliable. However, here too, a very reliable second position value POS2 can already be generated if the first absolute position value POS1 that is fed to memory unit 4.21 as an auxiliary position value HPOS is generated using position signals Z3_1 of first position detector 2.221 of first detector system 2.22.

The present invention is suitable for use in position-measuring devices which have a code carrier having at least two graduation tracks 1.21, 1.22 provided thereon which allow absolute position values POS1, POS2 to be generated by scanning these graduation tracks. Advantageous combinations include:

One absolute graduation track 1.21 and one incremental graduation track 1.22, as in the exemplary embodiments described with reference to FIGS. 5 and 6. Absolute graduation track 1.21 may be analog or parallel-coded or serial-coded in digital form.

Two incremental graduation tracks 1.21, 1.22 which have different graduation periods and where the phase angles that can be determined from the position signals yield unique pairs of values for all positions within the measurement range, as in the exemplary embodiment described with reference to FIG. 7.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C

What is claimed is:

1. A position-measuring device, comprising:
    a code carrier having at least a first graduation track and a second graduation track, the second graduation track being an incremental graduation track;
    a first detector system configured to scan the first graduation track and the second graduation track so as to generate first position signals;
    a second detector system configured to scan the second graduation track so as to generate second position signals;
    a first position-processing unit configured to process the first position signals so as to yield a first absolute position value; and
    a second position-processing unit configured to process the second position signals so as to yield a second absolute position value, the first position-processing unit being configured to feed an absolute auxiliary position value to the second position-processing unit and the second position-processing unit being initializable with the absolute auxiliary position value.

2. The position-measuring device as recited in claim 1, wherein the second position-processing unit includes:
    a fine position analyzer configured to process the second position signals so as to yield a fine position value and provide the fine position value to a counter that is initializable with the absolute auxiliary position value, the counter being configured to count changes of the fine position value so as to generate a coarse position value; and
    a position value generator configured to process the coarse position value and the fine position value so as to yield the second absolute position value.

3. The position-measuring device as recited in claim 1, wherein the second position-processing unit includes:
    a fine position analyzer configured to process the second position signals so as to yield a fine position value and provide the fine position value to a memory unit configured to store the absolute auxiliary position value or the second absolute position value as a coarse position value; and
    a position value generator configured to process the coarse position value and the fine position value so as to yield the second absolute position value.

4. The position-measuring device as recited in claim 1, wherein the first graduation track is an absolute graduation track, and the first position-processing unit includes a coarse position analyzer configured to process the first position signals that result from the scanning of the first graduation track so as to generate therefrom an absolute coarse position value which is fed to the second position-processing unit as the absolute auxiliary position value.

5. The position-measuring device as recited in claim 1, wherein the first graduation track is a first incremental graduation track and the second graduation track is a second incremental graduation track, the graduation tracks having a different number of graduation periods, and the first position-processing unit being configured to process the first position signals that result from the scanning of the first and second graduation tracks so as to generate therefrom the first absolute position value, of which at least a number of higher-order bits are fed to the second position-processing unit as the absolute auxiliary position value.

6. The position-measuring device as recited in claim 1, further comprising switching devices configured such that the absolute auxiliary position value is fed to the second position-processing unit via the switching devices.

7. The position-measuring device as recited in claim 1, wherein the second detector system includes a first position detector configured to scan the first graduation track and a second position detector configured to scan the second graduation track, and wherein position signals resulting from the scanning of the first graduation track are fed to the first position-processing unit via switching devices so as to generate the absolute auxiliary position value.

8. The position-measuring device as recited in claim 1, further comprising a communication unit configured to receive the first absolute position value and the second absolute position value and output the first absolute position value and the second absolute position value to subsequent electronics.

9. A method of operating a position-measuring device, comprising:
- providing a code carrier having at least a first graduation track and a second graduation track, the second graduation track being an incremental graduation track;
- scanning, by a first detector system, the first graduation track and the second graduation track so as to generate first position signals;
- scanning, by a second detector system, the second graduation track so as to generate second position signals;
- processing, by a first position-processing unit, the first position signals so as to yield a first absolute position value; and
- processing, by a second position-processing unit, the second position signals so as to yield a second absolute position value, wherein the second position-processing unit is initialized during an initialization phase with an absolute auxiliary position value which is fed to the second position-processing unit from the first position-processing unit.

10. The method as recited in claim 9, further comprising:
- processing, by a fine position analyzer of the second position-processing unit, the second position signals so as to yield a fine position value;
- counting, by a counter of the second position-processing unit which receives the fine position value, changes of the fine position value so as to generate a coarse position value, the counter being initialized during the initialization phase with the absolute auxiliary position value; and
- processing, by a position value generator of the second position-processing unit, the coarse position value and the fine position value so as to yield the second absolute position value.

11. The method as recited in claim 9, further comprising:
- processing, by a fine position analyzer of the second position-processing unit, the second position signals so as to yield a fine position value;
- storing, by a memory unit of the second position-processing unit which receives the fine position value, the absolute auxiliary position value, during the initialization phase, or the second absolute position value, as a coarse position value; and
- processing, by a position value generator of the second position-processing unit, the coarse position value and the fine position value so as to yield the second absolute position value.

12. The method as recited in claim 9, wherein the first graduation track is an absolute graduation track, and the first position-processing unit includes a coarse position analyzer which processes the first position signals that result from the scanning of the first graduation track so as to generate therefrom an absolute coarse position value which is fed to the second position-processing unit as the absolute auxiliary position value.

13. The method as recited in claim 9, wherein the first graduation track is a first incremental graduation track and the second graduation track is a second incremental graduation track, the graduation tracks having a different number of graduation periods, and the first position-processing unit processes the first position signals that result from the scanning of the first and second graduation tracks so as to generate therefrom the first absolute position value, of which at least a number of higher-order bits are fed to the second position-processing unit as the absolute auxiliary position value.

14. The method as recited in claim 9, wherein the absolute auxiliary position value is fed to the second position-processing unit from the first position-processing unit via switching devices.

15. The method as recited in claim 9, wherein the scanning, by the second detector system, includes scanning, by a first position detector, the first graduation track and scanning, by a second position detector, the second graduation track, and wherein position signals resulting from the scanning of the first graduation track are fed to the first position-processing unit via switching devices so as to generate the absolute auxiliary position value.

16. The method as recited in claim 9, further comprising feeding the first absolute position value and the second absolute position value to a communication unit and outputting the first absolute position value and the second absolute position value from the communication unit to subsequent electronics.

17. The method as recited in claim 9, wherein the initialization of the second position-processing unit is performed immediately after the position-measuring device is turned on.

* * * * *